US012348304B2

(12) United States Patent
Kaplan

(10) Patent No.: US 12,348,304 B2
(45) Date of Patent: Jul. 1, 2025

(54) ADJUSTABLE NULL STEERING IN A STATIONARY NETWORK

(71) Applicant: Infinidome Ltd., Caesarea (IL)

(72) Inventor: Moshe Kaplan, Pardes Hana-Karkur (IL)

(73) Assignee: Infinidome Ltd., Caesarea (IL)

( * ) Notice: Subject to any disclaimer, the term of this patent is extended or adjusted under 35 U.S.C. 154(b) by 503 days.

(21) Appl. No.: 17/708,033

(22) Filed: Mar. 30, 2022

(65) Prior Publication Data

US 2022/0329345 A1 Oct. 13, 2022

Related U.S. Application Data

(60) Provisional application No. 63/172,148, filed on Apr. 8, 2021.

(51) Int. Cl.
*H03D 1/04* (2006.01)
*H04K 3/00* (2006.01)

(52) U.S. Cl.
CPC ............... *H04K 3/224* (2013.01); *H04K 3/25* (2013.01); *H04K 3/42* (2013.01)

(58) Field of Classification Search
CPC ............. H04K 3/224; H04K 3/25; H04K 3/42
USPC ................................ 375/346, 316, 219, 295
See application file for complete search history.

(56) References Cited

U.S. PATENT DOCUMENTS

| | | | | |
|---|---|---|---|---|
| 4,161,733 | A | 7/1979 | Picsinger | |
| 4,280,128 | A | 7/1981 | Masak | |
| 4,516,126 | A | 5/1985 | Masak et al. | |
| 9,860,096 | B1 * | 1/2018 | Ganwani | H04W 4/33 |
| 2005/0136857 | A1 * | 6/2005 | Yamamoto | H01Q 21/205 455/132 |
| 2019/0051984 | A1 * | 2/2019 | Kuriyama | H01Q 3/2617 |

FOREIGN PATENT DOCUMENTS

| | | |
|---|---|---|
| GB | 2162693 | 2/1986 |
| GB | 2316232 | 2/1998 |

OTHER PUBLICATIONS

Mouhamadou et al. “Smart Antenna Array Patterns Synthesis: Null Steering and Multi-User Beamforming by Phase Control”, Progress in Electromagnetics Research, 60: 95-106, Feb. 6, 2006.

* cited by examiner

*Primary Examiner* — Zewdu A Kassa

(57) ABSTRACT

A null steering adjuster in a stationary wireless network identifies the presence or absence of a current set of phase differences in a dataset. The dataset includes legitimate sets of phase differences detected between radio frequency signals received by multiple antennas from respective legitimate sources. The current set of phase differences is detected between radio frequency signals currently received by the antennas. When the current set of phase differences is absent from the dataset, a null is created in the antenna pattern of the antennas in the direction of the currently-received radio frequency signals. When the current set of phase differences is present in the dataset, the antenna pattern is maintained.

21 Claims, 5 Drawing Sheets

| Legitimate source | Phase Difference from Antenna 1 (degrees) | | | | |
|---|---|---|---|---|---|
| | Ant. 2 | Ant. 3 | Ant. 4 | Ant. 5 | Ant. 6 |
| 1 | 85° | 253° | 320° | 4.2° | 162° |
| 2 | 73° | 98° | 252.8° | 196° | 56° |
| 3 | 355° | 104° | 227° | 85.7° | 186.5° |

FIG. 2A

| Sources | Phase Difference from Antenna 1 (degrees) | | | | | Legit. |
|---|---|---|---|---|---|---|
| | Ant. 2 | Ant. 3 | Ant. 4 | Ant. 5 | Ant. 6 | |
| 1 | 85.7° | 144° | 213° | 305° | 144° | No |
| 2 | 73° | 98° | 252.8° | 196° | 56° | Yes |

FIG. 2B

ADJUSTABLE NULL STEERING IN A STATIONARY NETWORK

RELATED APPLICATION(S)

This application claims the benefit of priority under 35 USC § 119(e) of U.S. Provisional Patent Application No. 63/172,148 filed on Apr. 8, 2021, the contents of which are incorporated by reference as if fully set forth herein in their entirety.

FIELD AND BACKGROUND OF THE INVENTION

The present invention, in some embodiments thereof, relates to detecting and combatting jamming in a stationary wireless network and, more particularly, but not exclusively, to detecting and combatting jamming in stationary wireless networks using null steering.

Wireless communication is an essential aspect of today's technological landscape. The integrity of the wireless communication must be maintained in order to ensure proper operation of wireless communication networks, such as mobile telephone networks, Global Navigation Satellite System (GNSS), Wi-Fi networks and many others.

Jamming is often employed to disrupt wireless communications between transmitters and receivers in wireless networks. The jammers transmit jamming signals which are intended to prevent establishing a communication link between legitimate network transmitters and receivers. Jamming is particularly effective when the signal strength of the received jamming signal is significantly higher than that of a legitimate received radio frequency (RF) signal.

Another form of attack on wireless networks is spoofing. In a spoofing attack, communication devices attempt to infiltrate the network by pretending to be a legal network participant.

There are a number of known techniques for providing resilience towards network jamming and spoofing. Some networks employ frequency hopping or other redundancy or diversity mechanisms to improve the success of communication. A problem with these mechanisms is that they negatively influence the efficiency of the system. Other diversity mechanisms (such as using more antennas and/or more robust coding) have similar negative impacts because the diversity mechanism(s) could instead be used to improve bit-rates or the capacity of the system.

Receivers may employ jamming spoofing and detection mechanisms, for example by analyzing the contents of received messages or by measuring power levels of received signals. Known network participants may be whitelisted, and messages having a whitelisted IP address are assumed to be legitimate. Receiver-based mechanisms generally are performed after a significant amount of signal processing and use of system resources (e.g. decoding a message to detect its IP address). These resources could otherwise be used for improving receiver performance.

A solution is needed to detect and mitigate attacks on wireless communication systems efficiently, without imposing a large burden on system resources.

Additional Background Art Includes:

1) Mouhamadou, M. & Vaudon, Patrick & Rammal, Mohammad. (2006). Smart Antenna Array Patterns Synthesis: Null Steering and Multi-User Beamforming by Phase Control. Progress in Electromagnetics Research-pier-PROG ELECTROMAGN RES. 60. 95-106. 10.2528/PIER05112801.

SUMMARY OF THE INVENTION

It is an object of the present invention to provide an apparatus, method and computer program product for detecting and protecting against transmissions from illegitimate sources in a stationary wireless network. Embodiments of the invention use null steering in multiple-antenna receivers in order to block interfering signals.

In a stationary wireless network, the geographic location of the transmitters and receivers (and/or transceivers) does not change during RF communications. In embodiments of the invention, a receiver station equipped with multiple antennas (i.e. an antenna array) learns the RF signal phase differences between antennas in its array for transmissions received from other network stations. The phase differences between the receiver station antennas indicate the direction of the transmitter station from which the transmission was received. Once a receiver station knows the respective phase differences for all the legitimate transmitters, it can monitor the received phase difference vector for received RF transmissions. If a transmission is not coming from the direction of a known legitimate source, a null is created in the antenna pattern in the direction of the received signal, thereby reducing the received power of the unknown transmitter.

This approach is effective against both jamming attacks and spoofing as well as against non-malicious interference from other sources operating in the same frequency band. It is also effective against the introduction of unauthorized members into the network.

According to a first aspect of some embodiments of the present invention there is provided a device for adjusting antenna null steering in a stationary wireless network. The device includes processing circuitry. The processing circuitry identifies the presence or absence of a current set of phase differences in a dataset. The dataset includes legitimate sets of phase differences detected between radio frequency signals received by multiple antennas from respective legitimate sources. The current set of phase differences is detected between radio frequency signals currently received by the antennas. When the current set of phase differences is absent from the dataset, a null is created in the antenna pattern of the antennas in the direction of the currently-received radio frequency signals. When the current set of phase differences is present in the dataset, the antenna pattern of the antennas is maintained.

According to some embodiments of the invention, the device further includes multiple couplers. Each of the couplers inputs a radio frequency signal from a respective antenna and couples the input radio frequency signal in parallel to multiple radio frequency signal processing elements.

According to some embodiments of the invention, the radio frequency signal processing elements include an analog to digital (A/D) converter and: a controllable phase shifter and/or variable gain amplifier (or variable attenuator).

According to some embodiments of the invention, the device further includes a phase difference detector to detect the phase differences between radio frequency signals coupled from the plurality of antennas.

According to some embodiments of the invention, the phase difference detector includes:

an analog to digital converter that converts the radio frequency signals coupled from the antennas into respective digital signals; and a digital signal processor that detects the phase differences between the radio frequency signals coupled from the antennas by digitally processing the respective digital signals.

According to some embodiments of the invention, the phase difference detector includes multiple phase detectors, each phase detector detecting phase differences between respective pairs of radio frequency signals coupled from the antennas.

According to some embodiments of the invention, the device further includes a memory that stores the dataset.

According to some embodiments of the invention, the device further includes an antenna pattern controller for adjusting at least one of respective phase shifts and respective amplitudes of the currently-received radio frequency signals in accordance with control signals from the processing circuitry.

According to a second aspect of some embodiments of the present invention there is provided a method for adjusting antenna null steering in a stationary wireless network. The method includes:

identifying a presence or absence in a dataset of a current set of phase differences detected between radio frequency signals currently received by a plurality of antennas, where the dataset includes legitimate sets of phase differences detected between radio frequency signals received by the plurality of antennas from respective legitimate sources;

when the current set of phase differences absent from the dataset, creating a null in a pattern of the plurality of antennas in a direction of the currently-received radio frequency signals; and when the current set of phase differences is present in the dataset, maintaining the pattern of the plurality of antennas.

According to some embodiments of the invention, the method further includes comprising coupling the radio frequency signals from each of the antennas in parallel to an analog to digital (A/D) converter and to: a controllable phase shifter and/or a variable gain amplifier/attenuator.

According to some embodiments of the invention, detecting the phase differences between the radio frequency signals received by the plurality of antennas is performed by digital signal processing.

According to some embodiments of the invention, the phase differences are detected between the radio frequency signals received by the plurality of antennas using at least one analog phase detector.

According to a third aspect of some embodiments of the present invention there is provided a non-transitory computer readable medium including instructions that, when executed by at least one processor, cause the at least one processor to perform operations comprising:

identifying a presence or absence in a dataset of a current set of phase differences detected between radio frequency signals currently received by a plurality of antennas, the dataset comprising legitimate sets of phase differences detected between radio frequency signals received by the plurality of antennas from respective legitimate sources;

when an absence of the current set of phase differences in the dataset is identified, creating a null in a pattern of the plurality of antennas in a direction of the currently-received radio frequency signals; and when a presence of the current set of phase differences in the dataset is identified, maintaining the pattern of the plurality of antennas.

According to some embodiments of the first, second and third aspects of the invention, creating a null in the pattern of the plurality of antennas includes adjusting at least one of respective phase shifts and respective amplitudes of the currently-received radio frequency signals.

According to some embodiments of the first, second and third aspects of the invention, the dataset is generated by:

detecting, for each of the legitimate sources, a respective set of phase differences between radio frequency signals received by the antennas; and storing the respective sets of phase differences as a data structure in a memory.

According to some embodiments of the first, second and third aspects of the invention, the dataset is initially generated during a preliminary phase and identifying the presence or absence is performed during a subsequent operational phase.

According to some embodiments of the first, second and third aspects of the invention, the dataset is regenerated when the configuration of the legitimate sources is changed.

According to some embodiments of the first, second and third aspects of the invention, the direction of the currently-received radio frequency signals is calculated based on an analysis of the current set of phase differences.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2A is a simplified representation of an exemplary dataset;

FIG. 2B is a simplified representation of phase difference vectors for received transmissions;

DESCRIPTION OF SPECIFIC EMBODIMENTS OF THE INVENTION

Figure 1:
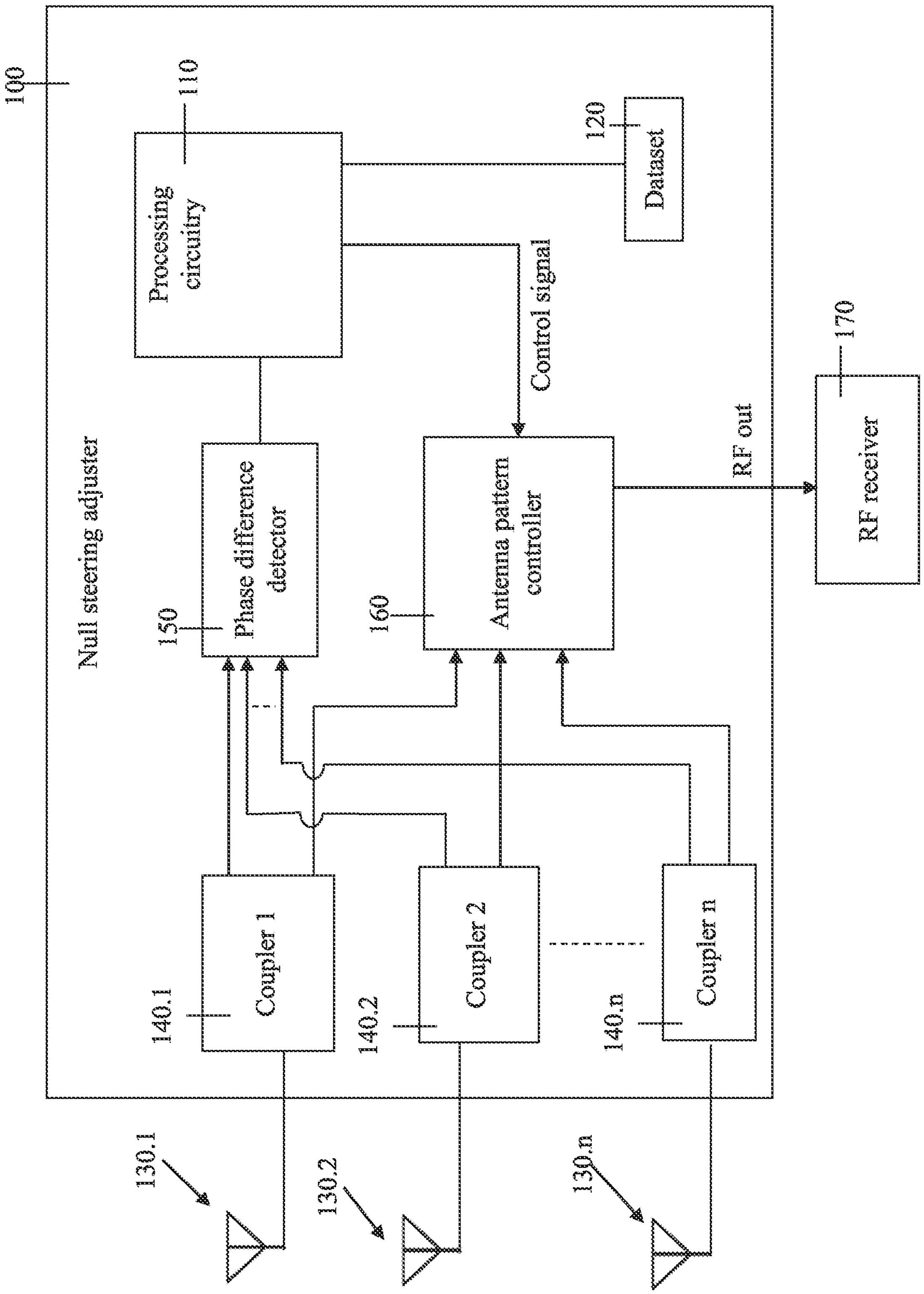
FIG. 1 is a simplified block diagram of a device for adjusting antenna null steering in a stationary wireless network according to some embodiments of the invention.

The present invention, in some embodiments thereof, relates to detecting and combatting jamming in a stationary wireless network and, more particularly, but not exclusively, to detecting and combatting jamming in stationary wireless networks using null steering.

In a multi-antenna receiver, the RF signals received for the same transmission at each of the antennas arrive at different phases. The different phases are due to the differences in the antenna locations relative to the transmitter which transmitted the signal. In a stationary wireless network, a receiver station equipped with an array of n antennas will have a minimum of n−1 phase differences between pairs of its antennas for each transmitting station.

A set of phase differences detected between the receiver station antennas for an RF signal received from a particular transmitter station is denoted herein a "phase differences vector". The phase differences vector indicates the direction of the transmitter station that transmitted the received RF signal. When a receiver station knows the phase difference vector for all the transmitter stations in the stationary network (denoted herein "legitimate sources") the receiving station effectively knows the direction of all the legitimate transmitter stations.

When the phase difference vector of a received RF signal is not the same as the phase difference vector of a known legitimate source (within an acceptable error), the RF signal is considered to have been transmitted by a station that is not a member of the stationary network (denoted herein an "illegitimate source"). A null is created in the antenna pattern of the receiving station in the direction of the illegitimate source. This reduces the power of the signal from the illegitimate source at the input to the RF receiver.

The null may be created by any means known in the art. Optionally the null is created by adjusting the respective phases and/or respective amplitudes of RF streams coupled from each antenna or after conversion of the RF streams to a different frequency band. Given an array of n antennas, up to n−1 nulls may be created simultaneously.

When the phase difference vector of the received RF signal is the phase difference vector of a legitimate source, a null is not created in the direction of the station that transmitted the RF signal because it is known to be part of the stationary network.

As used herein the term "station" means a node of the stationary wireless network that is capable of wireless communication with other network nodes by transmission and/or reception of RF signals.

As used herein the term "receiving station" means the station that received the RF signal.

As used herein the term "transmitter station" means the station which transmitted the RF signal that is received at the receiving station.

The terms "receiver station" and "transmitter station" are non-limiting terms that are used for the purpose of clarity in the description of some embodiments of the invention. Embodiments of the invention are not limited to networks which includes stations that only receive RF signals and stations that only transmit RF signals. Some or all of the network stations may both transmit and receive over the wireless network.

As used herein the term "RF stream" means an electrical RF signal output by an antenna.

Optionally, after phase and/or amplitude adjustment the RF signals are summed and provided to an RF receiver. Alternately or additionally, after phase and/or amplitude adjustment the RF signals are provided in parallel to an RF receiver.

Optionally, if no transmissions are being received from illegitimate sources the received RF signals are transferred to an RF receiver with no phase and/or amplitude adjustment.

Optionally, two phase difference vectors are considered the same when the Euclidean distance between the two phase difference vectors is less than a specified limit. Alternately or additionally, two phase difference vectors are considered different if the difference between one or more corresponding points of the vector (i.e. phase shift differences between the same pair of antennas) exceeds a specified limit.

The phase shifts may be adjusted when a new illegitimate source is identified (to add a new null) and/or when transmissions originating from a known illegitimate source terminate (to remove an unrequired null). This enables efficient control of the antenna pattern in order to block active illegitimate sources while not blocking transmissions originating from legitimate sources.

As will be appreciated by a person of skill in the art, embodiments of the invention are not limited to a specific frequency band and/or communication protocol, but rather may be adapted to the parameters (e.g. frequency band) of the stationary network.

The configuration of the wireless network may be any configuration known in the art. For example the stationary wireless network may be a mesh network in which any station may communicate with any other station, a star network in which there is a master station that communicates with the rest of the stations, or a combination of star and mesh networks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

I. Null Steering Adjuster

Reference is now made to FIG. 1, which is a simplified block diagram of a device for adjusting antenna null steering in a stationary wireless network according to some embodiments of the invention.

Null steering adjuster 100 includes processing circuitry 110 which performs processing operations required to perform null steering, according to any of the embodiments described herein. Processing circuitry 110 may include one or more processors and a non-transitory storage medium carrying instructions for execution, which when executed by the processing circuitry cause it to perform some or all of the tasks described herein.

Processing circuitry 110 may include one or more hardware components, including but not limited to: field programmable gate arrays (FPGAs), application-specific integrated circuits (ASICs), system-on-a-chip systems (SOCs), general-purpose microprocessors, microcontrollers and digital signal processors (DSPs).

Some embodiments of the invention are described herein for a non-limiting case in which transmissions are received from a single transmitting station. When RF transmissions are received concurrently from multiple transmitting stations, the received RF signal may be processed by any means in the art to isolate the transmissions from each station so that a respective phase difference vector may be determined for each transmitting station (e.g. by filtering the received RF signal into multiple frequency bands). Alternately or additionally, the detection and analysis of phase differences between antennas is performed even when multiple transmissions are received simultaneously.

Processing circuitry 110 uses a dataset (illustrated schematically in FIG. 1 as dataset 120) in order to determine whether a received signal was transmitted by a legitimate source. The dataset contains one or more phase difference vectors. Each phase difference vector in the dataset is a set of phase differences detected between receiver station antennas for RF signals received from the same legitimate source.

During operation, null steering adjuster 100 creates a phase difference vector for an RF signal currently being received at the receiver station (denoted herein the "current phase difference vector") by detecting the phase differences between the RF signals received by different receiver station antennas. If the current phase difference vector is not present in dataset 120, the received RF signal is assumed to be from an illegitimate source. A null is created in the receive antenna pattern in the direction of the illegitimate source. The null is created by adjusting the respective phase shifts and/or amplitudes of the RF signals transferred from each antenna to the RF receiver (or other RF processing element).

If the current phase vector is present in the dataset, the transmission is assumed to be from a legitimate source. The current antenna pattern is maintained, since there is no need to reduce the received power of the transmission from a legitimate source.

As used herein the term "maintain the current antenna pattern" means that no nulls are added to or removed from the receive antenna pattern (e.g. no changes are made to the respective phase shifts and amplitudes of the coupled RF streams).

For the purpose of clarity, some embodiments of the invention are described under the non-limiting assumption that all phase vectors in the dataset are associated with legitimate sources.

Reference is now made to FIG. 2A, which is a simplified representation of an exemplary dataset. In this example, the receiving station has six antennas, antennas 1-6, thus the length of each phase difference vector is five. The number of phase difference vectors in the dataset is three, where each phase difference vector indicates the direction of a legitimate source.

Reference is now made to FIG. 2B, which shows exemplary phase difference vectors for two RF transmissions received by the receiving station. Phase difference vector 1 is absent from the dataset shown in FIG. 2A. This indicates that the transmission from Source 1 is not coming from the direction of a known legitimate source. Therefore null steering adjuster 100 will direct a null towards Source 1. Phase difference vector 2 is present in the dataset, indicating that the transmission is coming from the direction of a known legitimate source. Therefore null steering adjuster 100 will not direct a null towards Source 2.

As used herein the term "direct a null" means that a null is created in the combined antennas pattern so that RF signals originating from a given direction are received with high attenuation.

Referring again to FIG. 1, processing circuitry 110 calculates the new phase shift settings based on an analysis of the current phase difference vector. If a phase shift is already being applied to the RF signals to direct nulls to other illegitimate sources, the analysis takes into account all of the known illegitimate sources and calculates phase shift settings which will direct an additional null in the direction of the newly-identified illegitimate source. This process may be performed by recalculating all the required nulls (with a maximum of n−1 nulls), and setting the respective phase and respective amplitude of each antenna, creating a combined antenna pattern that nullifies all active illegitimate transmitters.

Optionally, an initial dataset 120 is generated during a training phase before the receiving station has begun regular operations. During the training phase null steering adjuster 100 assumes that each RF signal within the network-defined frequency bands is coming from a legitimate source (i.e. a station in the stationary network). Null steering adjuster 100 generates the phase difference vectors for all received signals in defined frequency band(s) and saves them as the dataset.

Optionally, dataset 120 is updated during regular operations, for example when the network configuration is changed (e.g. a new station is added to the network). Further optionally, updating dataset 120 is performed similarly to the training phase. Dataset 120 may be stored in any memory that is accessible to processing circuitry 110, including but not limited to:

1) A memory module within processing circuitry 110;
2) An internal memory in null steering adjuster 100; and
3) An external memory.

Optionally, null steering adjuster includes a digital interface for inputting and outputting digital information (e.g. phase difference vectors, dataset, digitized RF signals, control signals, etc.).

Null steering adjuster 100 optionally includes one or more additional RF and/or digital processing elements. These RF and/or digital processing elements may include but are not limited to:

1) Couplers (140.1-140.*n*)—Each of the couplers couples an RF stream input from a respective antenna (130.1-130.*n*) to at least two RF signal processing elements;
2) Phase difference detector 150 detects the phase differences between the RF signals coupled from antennas 130.1-130.*n* by digital and/or analog signal processing (as described in more detail below);

3) Antenna pattern controller 160 controls the respective phase shifts and/or amplitudes of the coupled RF signals based on control signals from processing circuitry 110. The phase and/or amplitude adjustments introduced by antenna pattern controller 160 in response to the control signals are calculated to create a receive antenna pattern with nulls in the directions of illegitimate sources. Antenna pattern controller 160 then outputs the RF signals to RF receiver 170, after combining them into a single RF signal; and
4) A frequency converter which converts the coupled RF streams to a different frequency band.

An exemplary embodiment including all of these components is described below in reference to FIG. 3.

As used herein the term "RF signal processing element" means a hardware element capable of inputting an RF signal, processing the RF signal and outputting an analog and/or digital signal resulting from processing the RF signal.

I.1. Phase Difference Detector

Optionally, phase difference detector 150 includes at least one sampler, at least one analog to digital (A/D) converter (capable of handling multiple RF signals) and a digital signal processor. The sampler(s) sample the analog signals coupled from antennas **130.1-130.*n***, either with or without downconversion to a different frequency band (e.g. to an intermediate frequency or baseband). The A/D converter(s) convert the samples into respective digital signals. The digital signal processor (DSP) digitally processes the digital signals from A/D converter and detects the phase differences between the RF signals.

Alternately or additionally, phase difference detector 150 includes one or more analog phase detectors which detect phase differences between respective pairs of RF signals coupled from the antennas.

II. First Exemplary Embodiment of a Null Steering Adjuster

An exemplary embodiment of a null steering adjuster which includes couplers, a phase difference detector and an antenna pattern controller is now described with reference to FIG. 1.

RF streams from antennas **130.1-130.*n* are input to respective couplers 140.1-140.*n*. Each coupler splits its respective RF signal and provides the signals to phase difference detector 150 and to antenna pattern controller 160. Optionally, more of the signal power is coupled to antenna pattern controller 160 than to phase difference detector 150**.

Phase difference detector 150 determines a current phase difference vector for the RF signals from couplers **140.1-140.*n*. The current phase difference vector is passed to processing circuitry 110**.

Processing circuitry 110 determines whether the phase difference vector (or a sufficiently close phase difference vector) is present in dataset 120. If the current phase difference vector is present in dataset 120, processing circuitry 110 maintains the current receive antenna pattern. If the current phase difference vector is absent from dataset 120, processing circuitry 110 analyzes the current phase difference vector and adjusts the control signals for antenna pattern controller 160 so as to direct a null in the direction indicated by the current phase difference vector. Antenna pattern controller 160 adjusts the phase and/or amplitude of the coupled RF signals in accordance with the control signals from processing circuitry 110.

Optionally, antenna pattern controller 150 includes an array of controllable phase shifters and an array of variable gain amplifiers (and/or variable attenuators). The phase and amplitude of each RF signal are adjusted by controlling the RF signal's respective phase shifter and respective variable gain amplifier/attenuator.

Optionally, when no illegitimate sources are detected the antenna signals bypass the antenna pattern controller 160 and at least one of the antenna signals is transferred directly to an RF receiver. Alternately or alternatively, the antenna signals are transferred to the RF receiver through antenna pattern controller 160 which is adjusted to a no-null pattern.

Optionally, antenna pattern controller 160 combines the RF signals (after phase and/or amplitude control) before outputting them to RF receiver 170. In alternate embodiments (not shown), multiple RF signals are output in parallel to RF receiver 170 which combines them internally.

Optionally, null steering adjuster 100 is external to RF receiver 170 as shown in FIG. 1. In alternate embodiments the null steering adjuster is integrated into the RF receiver.

III. Second Exemplary Embodiment of a Null Steering Adjuster

Figure 3:
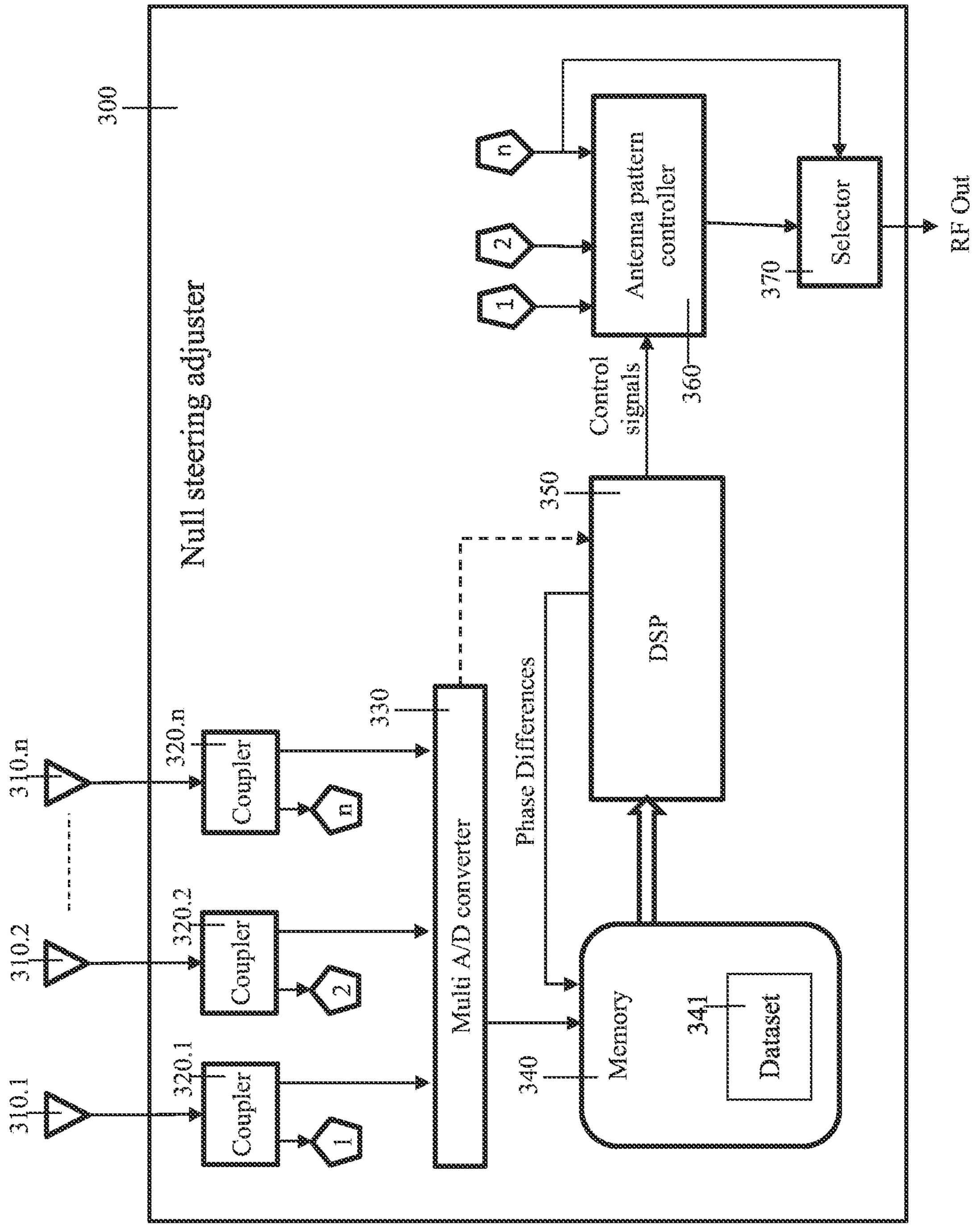
FIG. 3 is a simplified block diagram of a device for adjusting antenna null steering in a stationary wireless network according to an exemplary embodiment of the invention.

Reference is now made to FIG. 3, which is a simplified block diagram of a device for adjusting antenna null steering in a stationary wireless network according to an exemplary embodiment of the invention. In the embodiment of FIG. 3, phase difference detection is performed by digital signal processing after the RF signals coupled from the antennas are converted into digital signals (optionally after downconversion to an intermediate frequency or to baseband).

Couplers **320.1-320.*n* input RF streams from respective antennas 310.1-320.*n*. Each coupler couples the respective RF stream to Multi A/D converter 330 and to antenna pattern controller 360**.

Multi A/D converter 330 converts each of the coupled RF signals to digital form and stores sequences of the digitized signals and/or other information derived from the RF signals in internal memory 340.

DSP 350 performs signal processing operations on the stored sequences of the digitized signals in order to generate dataset 341 and to control antenna pattern controller 360.

Alternately or additionally, multi A/D converter 330 provides the digitized signals directly to DSP 350 for processing, and may or may not store sequences of the digitized signals in internal memory 340.

Signal processing operations performed by DSP 350 include but are not limited to:

1) Calculating phase differences between the digitized RF signals and forming phase difference vectors for respective sources;
2) Creating dataset 341 which contains phase vectors for legitimate sources;
3) Storing dataset 341 in internal memory 340;
4) Determining whether a current phase difference vector is present in dataset 341; and
5) Generating control signals for antenna pattern controller 360 so as to create nulls in the antenna pattern in the direction of one or more illegitimate sources.

Antenna pattern controller 360 performs phase and amplitude adjustment of the RF streams coupled from antennas **310.1-310.*n*, combines the adjusted RF signals and outputs the combined RF signal to selector 370**.

The signals from one of antennas **310.1-320.*n* is also coupled to selector 370 which functions effectively as a switch, selecting which RF signals will be output by null steering adjuster 300. If no nulls are being created in the receive antenna pattern, antenna pattern controller 360 is bypassed and selector 370 outputs one of the received RF signals. If nulls are being created in the receive antenna pattern, selector 370 outputs the RF signals(s) after adjustment by antenna pattern controller 360**.

Optionally processing instructions for DSP 350 are stored in memory 340.

IV. Method for Null Steering in a Stationary Wireless Network

Figure 4:
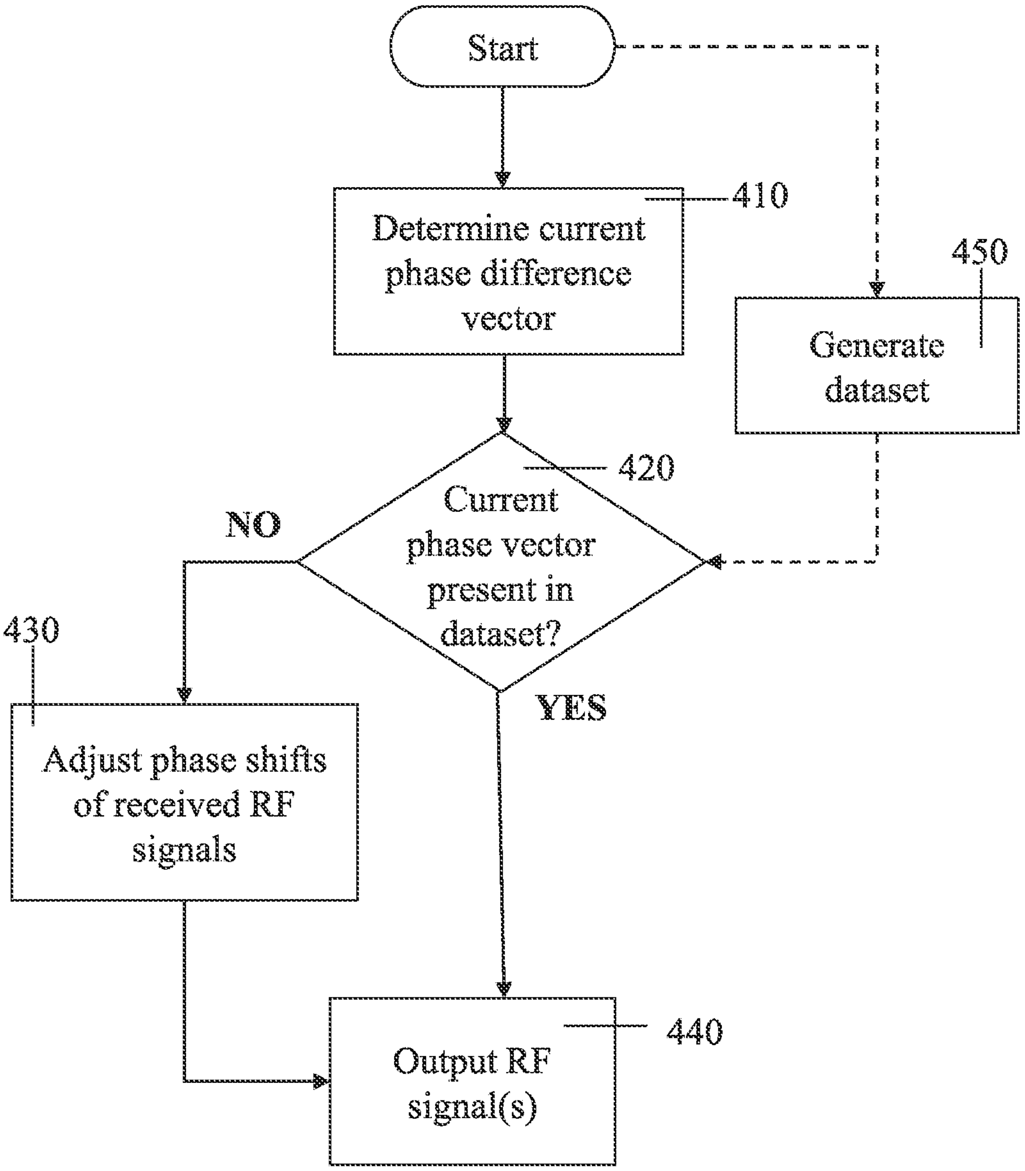
FIG. 4 is a simplified flowchart of a method for adjusting antenna null steering in a stationary wireless network, according to some embodiments of the invention.

Reference is now made to FIG. 4 which is a simplified flowchart of a method for adjusting antenna null steering in a stationary wireless network, according to some embodiments of the invention.

In 410 a phase difference vector is determined for RF signals currently being received by the antennas. The current phase difference vector may be determined by digital signal processing and/or using analog phase detectors as described above.

In 420 the dataset is checked in order to determine whether the current phase difference vector is present or absent in the dataset.

When the current phase difference vector is not present in the dataset, in 430 the phase and/or amplitude adjustments applied to the RF signals coupled from the antennas create a null or nulls in the antenna pattern in the direction of the received RF signal(s).

As noted above, given an array of n receive antennas, it is possible to create up to n−1 nulls in the antenna array. Optionally, when the antenna pattern already has n−1 nulls, the phase shifts and/or amplitudes are adjusted to remove one of the nulls from the antenna pattern and add the new null direction instead. Further optionally, the oldest null in the antenna pattern is removed (i.e. the null directed to the interfering signal detected the longest time previously).

When the current set of phase differences is present in the dataset, the phase and/or amplitude adjustments applied to the RF signals are not changed.

In 440, the adjusted RF signals are either:

i) Output after being combined into a single RF signal; or ii) Output in parallel.

Optionally, the method further includes generating the dataset in 450.

Optionally, an initial dataset is generated in a preliminary phase, prior to the operational phase shown in 410-440.

Optionally the method further includes coupling the RF signals from each of the antennas to an analog to digital (A/D) converter and to an antenna pattern controller in parallel, optionally after conversion to a different frequency band. The A/D converter digitizes the RF signals in preparation for digital signal processing. The antenna pattern controller phase shifts the RF signals and amplifies or attenuates them based on control signals which direct null(s) in the direction of illegitimate source(s).

V. Method for Generating a Dataset

Figure 5:
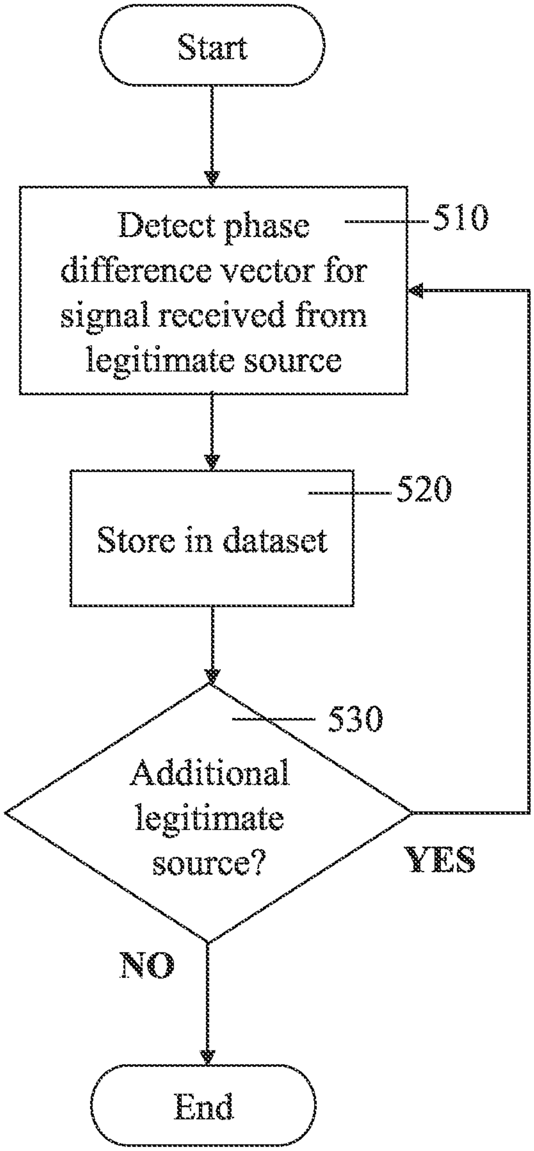
FIG. 5 is a simplified flowchart of generating a dataset, according to an exemplary embodiment of the invention.

Reference is now made to FIG. 5, which is a simplified flowchart of generating a dataset, according to an exemplary embodiment of the invention. In 510 a phase difference vector is detected for an RF signal received from a legitimate source. In 520 the phase difference vector is stored as an entry in the dataset. At 530 the method repeats for each legitimate source that is found. When there are no further legitimate sources the dataset is complete and the method ends.

The claimed embodiments provide a technique for identifying and blocking transmissions from unknown transmitter stations in a stationary network. The illegitimate sources are identified by detecting phase differences between received RF signals and comparing them to an established dataset. Transmissions from the illegitimate sources are blocked or reduced by adjusting the phase and/or amplitude of the received RF signals before they arrive at the RF receiver. The receive antenna pattern is thus controlled to direct nulls in the direction of illegitimate sources. Both phase difference detection and antenna pattern control may be performed extremely rapidly and require limited processing resources, making the claimed embodiments an effective technique for combatting jamming and spoofing attacks.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant antennas, stationary networks, couplers, phase detectors, phase shifters, variable gain amplifiers, variable attenuator, dataset structures, analog to digital converters, digital signal processors, techniques for null steering and techniques for phase difference detection will be developed and the scope of the term antenna, stationary network, coupler, phase difference detector, phase shifter, variable gain amplifier, variable attenuator, dataset structure, analog to digital converter, digital signal processor, null steering and phase difference detection is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicants that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for adjusting antenna null steering in a stationary wireless network, comprising:

a processing circuitry configured to:

in a dataset, identify a presence or absence of a current set of phase differences detected between radio frequency signals currently received by a plurality of antennas, said dataset comprising legitimate sets of phase differences detected between radio frequency signals received by said plurality of antennas from respective legitimate sources;

when an absence of said current set of phase differences in said dataset is identified, create a null in a pattern of said plurality of antennas in a direction of said currently-received radio frequency signals; and when a presence of said current set of phase differences in said dataset is identified, maintain said pattern of said plurality of antennas.

2. The device for adjusting antenna null steering according to claim 1, further comprising a plurality of couplers, each of said couplers being configured to input a radio frequency signal from a respective antenna and to couple said input radio frequency signal in parallel to a plurality of radio frequency signal processing elements.

3. The device for adjusting antenna null steering according to claim 2, wherein said plurality of radio frequency signal processing elements comprise an analog to digital (A/D) converter and at least one of a controllable phase shifter and a variable gain amplifier.

4. The device for adjusting antenna null steering according to claim 1, further comprising a phase difference detector configured to detect said phase differences between radio frequency signals coupled from said plurality of antennas.

5. The device for adjusting antenna null steering according to claim 4, wherein said phase difference detector comprises:

an analog to digital converter configured to convert said radio frequency signals coupled from said antennas into respective digital signals; and a digital signal processor configured to detect said phase differences between said radio frequency signals coupled from said antennas by digitally processing said respective digital signals.

6. The device for adjusting antenna null steering according to claim 4, wherein said phase difference detector comprises a plurality of phase detectors configured to detect phase differences between respective pairs of said radio frequency signals coupled from said antennas.

7. The device for adjusting antenna null steering according to claim 1, further comprising a memory configured to store said dataset.

8. The device for adjusting antenna null steering according to claim 1, wherein said processing circuitry is further configured to calculate said direction of said currently-received radio frequency signals based on an analysis of said current set of phase differences.

9. The device for adjusting antenna null steering according to claim 1, further comprising an antenna pattern controller configured to adjust at least one of respective phase shifts and respective amplitudes of said currently-received radio frequency signals in accordance with control signals from said processing circuitry.

10. A method for adjusting antenna null steering in a stationary wireless network, comprising:

in a dataset, identifying a presence or absence of a current set of phase differences detected between radio frequency signals currently received by a plurality of antennas, said dataset comprising legitimate sets of phase differences detected between radio frequency signals received by said plurality of antennas from respective legitimate sources;

when an absence of said current set of phase differences in said dataset is identified, creating a null in a pattern of said plurality of antennas in a direction of said currently-received radio frequency signals; and when a presence of said current set of phase differences in said dataset is identified, maintaining said pattern of said plurality of antennas.

11. The method for adjusting antenna null steering according to claim 10, wherein said creating a null in said pattern of said plurality of antennas comprises adjusting at least one of respective phase shifts and respective amplitudes of said currently-received radio frequency signals.

12. The method for adjusting antenna null steering according to claim 10, further comprising generating said dataset by:

detecting, for each of said legitimate sources, a respective set of phase differences between radio frequency signals received by said antennas; and storing said respective sets of phase differences as a data structure in a memory.

13. The method for adjusting antenna null steering according to claim 12, wherein said dataset is initially generated during a preliminary phase and said identifying said presence or absence is performed during a subsequent operational phase.

14. The method for adjusting antenna null steering according to claim 12, wherein said dataset is regenerated when a configuration of said legitimate sources is changed.

15. The method for adjusting antenna null steering according to claim 10, further comprising coupling said radio frequency signals from each of said antennas in parallel to an analog to digital (A/D) converter and to at least one of a controllable phase shifter and a variable gain amplifier.

16. The method for adjusting antenna null steering according to claim 10, wherein said detecting said phase differences between said radio frequency signals received by said plurality of antennas is performed by digital signal processing.

17. The method for adjusting antenna null steering according to claim 10, wherein said detecting said phase differences between said radio frequency signals received by said plurality of antennas comprises using at least one analog phase detector configured to detect phase differences between radio frequency signals input from two of said antennas.

18. The method for adjusting antenna null steering according to claim 10, further comprising calculating said direction of said currently-received radio frequency signals based on an analysis of said current set of phase differences.

19. A non-transitory computer readable medium including instructions that, when executed by at least one processor, cause the at least one processor to perform operations comprising:

in a dataset, identifying a presence or absence of a current set of phase differences detected between radio frequency signals currently received by a plurality of antennas, said dataset comprising legitimate sets of phase differences detected between radio frequency signals received by said plurality of antennas from respective legitimate sources;

when an absence of said current set of phase differences in said dataset is identified, creating a null in a pattern of said plurality of antennas in a direction of said currently-received radio frequency signals; and when a presence of said current set of phase differences in said dataset is identified, maintaining said pattern of said plurality of antennas.

20. The non-transitory computer readable medium according to claim 19, wherein said operations further comprise generating said dataset by:

detecting, for each of said legitimate sources, a respective set of phase differences between radio frequency signals received by said antennas; and storing said respective sets of phase differences as a data structure in a memory.

21. The non-transitory computer readable medium according to claim 19, wherein said creating a null in said pattern of said plurality of antennas comprises adjusting at least one of respective phase shifts and respective amplitudes of said currently-received radio frequency signals.

* * * * *